Patented Aug. 2, 1949

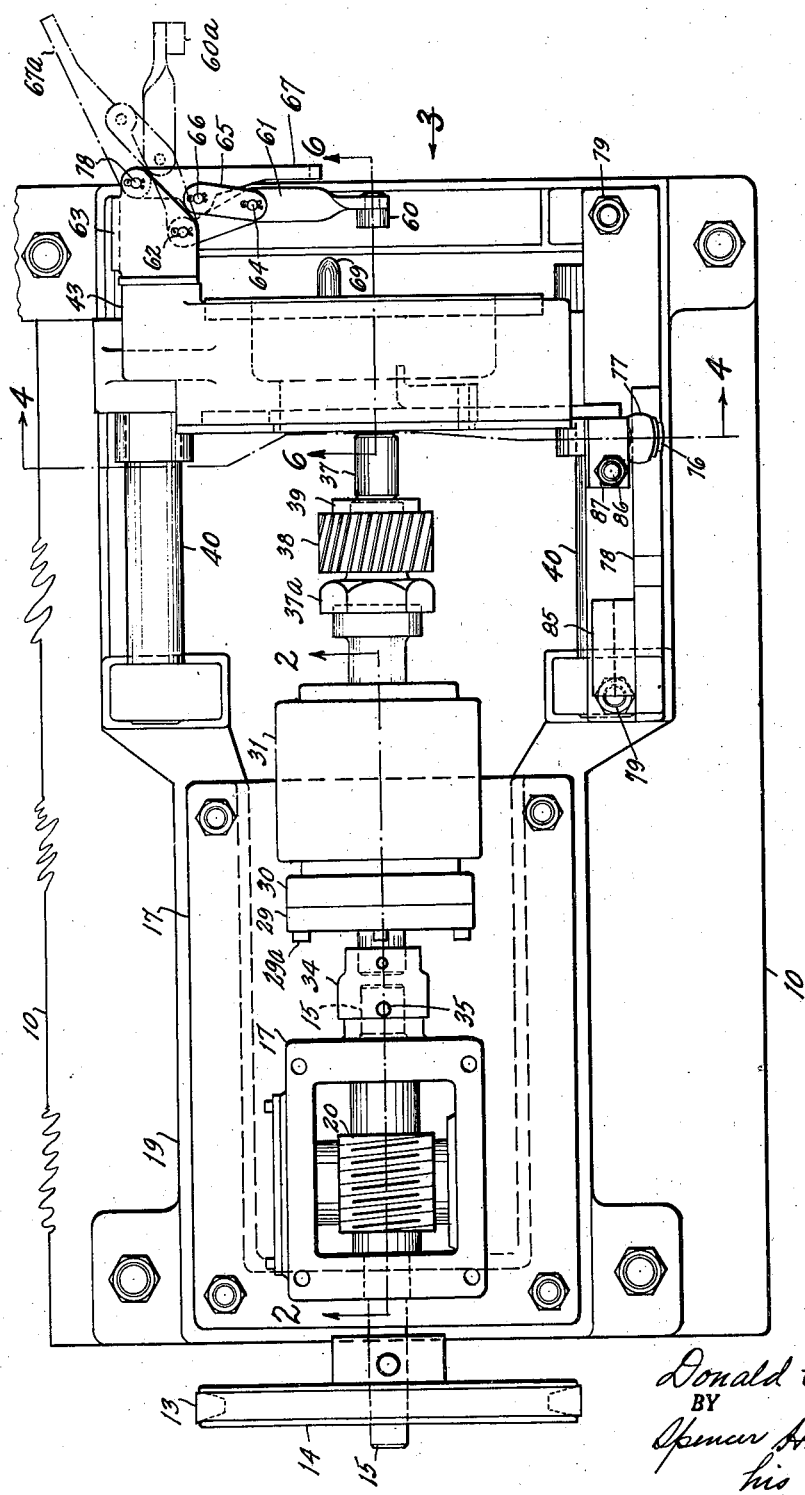

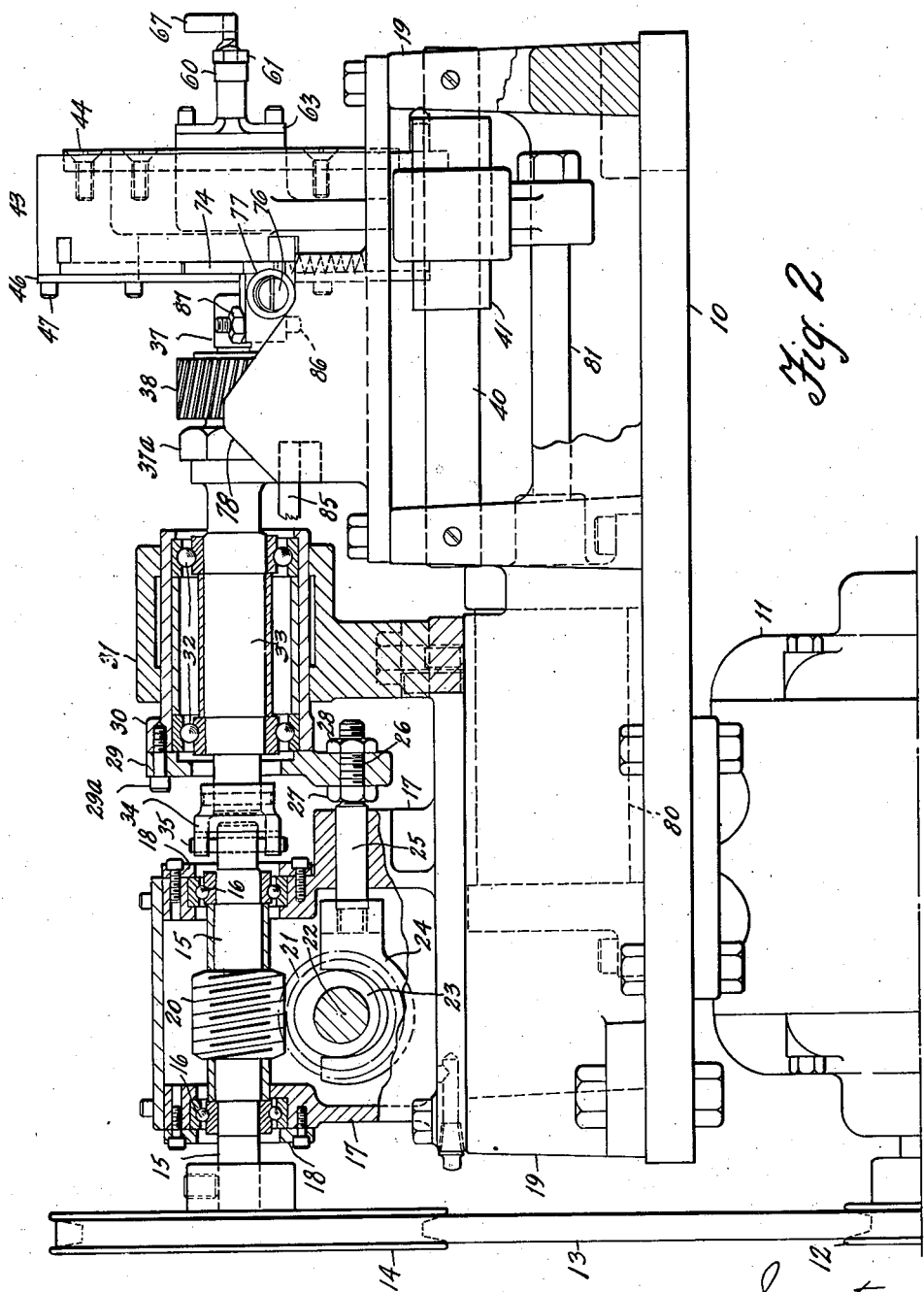

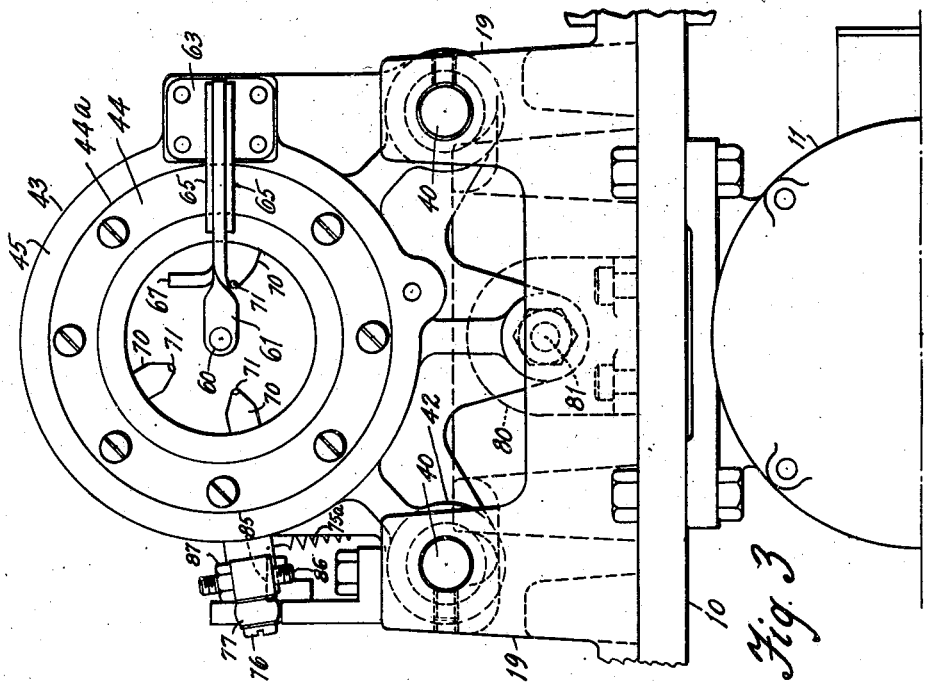

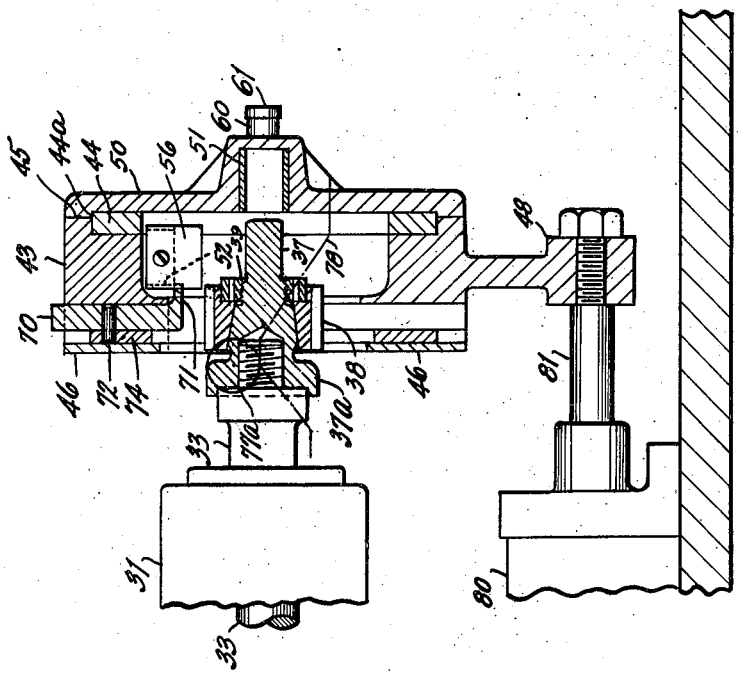
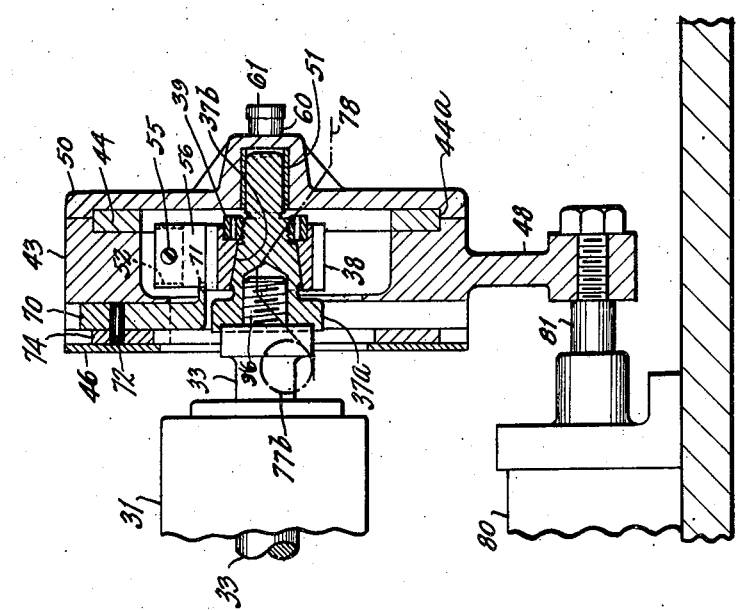

2,477,900

UNITED STATES PATENT OFFICE 2,477,900

DYNAMO BRUSH SURFACING APPARATUS

Donald C. Ridge, Anderson, Ind., assignor to General Motors Corporation, Detroit, Mich., a corporation of Delaware Application November 26, 1946, Serial No. 712,324

4 Claims. (Cl. 90—18)

This invention relates to brush rigging for a dynamoelectric machine and its object is to provide apparatus for surfacing the brushes after assembly with the brush rigging and the latter with an end frame of the machine in order that the brushes will accurately fit the commutator with which they are to be used.

Further objects and advantages of the present invention will be apparent from the following description, reference being had to the accompanying drawings, wherein a preferred embodiment of the present invention is clearly shown.

In the drawings:

Fig. 1 is a plan view of brush surfacing apparatus embodying the present invention.

Fig. 2 is a side view thereof, partly in section, the section being taken on line 2—2 of Fig. 1.

Fig. 3 is an end view in the direction of arrow 3 of Fig. 1.

Fig. 4 is a sectional view on line 4—4 of Fig. 1.

Fig. 5 is a fragmentary sectional view on line 5—5 of Fig. 4.

Fig. 6 is a fragmentary sectional view on line 6—6 of Fig. 1, showing a brush setting cutter in a position intermediate between fully out and fully in position, the fully out position being shown in Fig. 1.

Fig. 7 is a view similar to Fig. 6, showing the brush setting cutter in the fully in position.

Referring to the drawings, the machine comprises a base or table 10 supported above the floor in any suitable manner and supporting an electric motor 11 which drives a pulley 12 connected by a belt 13 with a pulley 14 which drives a shaft 15 journaled in bearings 16 supported by a frame 17 and retained by plates 18. Frame 17 is supported by a sub-frame 19 supported by the table 10. Shaft 15 drives a worm 20 meshing with a worm gear 21 attached to a shaft 22 rotatably supported by the frame 17. Shaft 22 drives an eccentric 23 which effects reciprocation of an eccentric yoke 24 attached to a rod 25 supported for horizontal sliding movement by the frame 17. Rod 25 has a threaded portion 26 receiving nuts 27 and 28 and passing through a plain hole in a plate 29 which screws 29a attach to a sleeve 30, guided for horizontal sliding movement by a frame 31 supported by the base of frame 17. Sleeve 30 supports bearings 32 for a shaft 33 connected by a coupling yoke 34 and coupling pin 35 with shaft 15. Shaft 33 has a threaded connection 36 with a shaft extension 37 having a hex 37a to which a wrench can be applied. Shaft extension 37 provides a tapered portion 37b for receiving a tooth cutter 38 retained on the conical seat by a nut 39.

When shaft 15 rotates, the cutter 38 rotates and is reciprocated axially by the eccentric 23.

The frame 19 supports parallel rods 40 which support for horizontal sliding movement two sleeves 41 press-fitted into tubular parts 42 of a work holder frame 43. Frame 43 supports a ring 44 providing a shoulder 44a extending beyond the right surface 45 of the frame 43 (Fig. 6). The shoulder 44a provides a seat for locating an end frame 50 of a dynamoelectric machine, for example, the commutator-end-frame of a third brush generator. This end frame provides a bearing bushing 51 for receiving the dynamo armature shaft (not shown) and supports a brush rigging including three brush holders, one being shown at 52 in Fig. 5 and being mounted to swing on a stud 53 attached to a plate 54 attached to the end frame 50. A screw 55 secures a brush 56 to the brush holder 52 and a spring 57 urges the brush toward the axis of the armature shaft which fits in the bearing 51.

The end frame 50 is held in the position shown in Figs. 6 and 7 by engagement therewith by a stud 60 (Fig. 1) attached to a lever 61 pivotally supported by a pin 62 carried by a bracket 63 attached to the frame 43. Lever 61 is connected by a pin 64 with a link 65 connected by a pin 66 with a handle 67 pivotally supported by a pin 68 carried by the bracket 63. When the handle 67 is moved in to position 67a, the stud 60 will be in the position 60a. After the end frame 50 has been placed upon the ring 44 and properly located by a dowel 69 which enters a hole in the frame, the handle 67 is moved to the full line position so that the stud 60 engages the frame 50 and retains it in position. It will be noted that when stud 60 is so positioned by handle 67, the center line of the pin 66 will be slightly to the left of a line intersecting the center lines of the pins 64 and 66. Therefore, the frame 50 is retained in proper position upon the work holder frame 43.

The apparatus provides for the lifting or retraction of the brush holders from the axis of the cutter shaft 37 as the frame 43 is moved left from the position shown in Fig. 1 to the position shown in Figs. 6 and 7. For this purpose, the frame 43 provides slide bars 70 equal in number to the number of brush holders. Each slide bar has a finger 71 for engaging an arm 52 of the brush holder. Each bar 70 carries a pin 72 for engaging a cam slot 73 in an annular cam 74 having an arm 75 supporting a screw 76 providing a pivot for a roller 77 engageable with a fixed cam 78 which screws 79 attach to the sub-frame 19.

The bars 70 and the cam 74 are retained by a ring 46 attached to holder 43 by screws 47.

The work holder frame 43 is moved horizontally by an hydraulic or pneumatic servo-motor comprising a cylinder 80 supported by the table 10 (Fig. 2) and containing a piston (not shown) attached to a rod 81 which is connected, as shown in Figs. 6 and 7, with an extension 48 of the frame 43. By a suitable valve mechanism, not shown, the rod 81 is caused to move left or right. In Fig. 1, the frame 43 is shown in the extreme right position. During left motion of the frame 43 to a position such as shown in Fig. 6, the roller 77, shown in position 77a in dot-dash lines, has been moved to the high part of the cam 78, shown in dot-dash lines. This effects a counterclockwise movement of the plate 74 from the position shown in Fig. 4, thereby causing the bars 70 and their fingers 71 to move away from the cutter shaft 37, thereby locating the brushes 56 out of range of the cutter 38. As the frame 43 continues to move toward the left, to the position shown in Fig. 7, a spring 75a connecting arm 75 with the frame 43, causes the roller 77 to follow the cam 78 downwardly, thereby effecting clockwise movement of the plate 74 until finally this motion is stopped by engagement of a shelf 85 by a set screw 86 threadedly supported by the plate 74 and secured in adjusted position by a lock nut 87. When this occurs the finger extension 71 of the bars 70 no longer retain the brushes 56 and their springs 53 press them against the cutter 38 which surfaces the brushes cylindrically to conform to the surface of the commutator which is mounted on the armature shaft. The diameter of cutter 38 is equal to the diameter of the commutator which is to be engaged by the brushes. The axis of the cutter 38 is the axis of the shaft extension 37 which enters the bearing bushing 51 of end frame 50 and causes it to be centered accurately relative to the cutter periphery, there being a slight clearance between the frame 50 and the shoulder 44a of ring 44.

While the embodiment of the present invention as herein disclosed, constitutes a preferred form, it is to be understood that other forms might be adopted, all coming within the scope of the claims which follow.

What is claimed is as follows:

1. Apparatus for surfacing dynamo-electric-machine brushes mounted upon an end frame of the machine for movement under spring pressure toward the commutator of the machine, said apparatus comprising a rotary cutter for surfacing the brushes for proper seating thereof upon the commutator, a work holder for supporting the end frame and brushes assembled therewith, means for effecting relative axial movement between the work holder and the cutter, and means operating in response to said relative axial movement for retracting the brushes from the cutter during a portion of said relative axial movement and for releasing the retracting means during another portion of said relative axial movement, said spring pressure then moving the brushes to engage the cutter after the cutter is between the brushes.

2. Apparatus according to claim 1 further characterized by the provision of means actuated during rotation of the cutter for reciprocating the cutter axially.

3. Apparatus according to claim 1 further characterized by the provision of a means for retaining the end frame upon the work holder which means permits lateral movement of the end frame and by the provision of an extension of the shaft which carries the cutter, said extension, during the brush surfacing operation, being received by an armature shaft bearing provided by the end frame.

4. Apparatus for surfacing dynamo-electric machine brushes mounted upon an end frame of the machine for movement under spring pressure toward the commutator of the machine, said apparatus comprising, a rotary cutter for surfacing the brushes for proper seating thereof upon the commutator, a work holder for supporting the end frame and brushes assembled therewith, means for effecting relative axial movement between the work holder and the cutter, a plurality of radial grooves in work holder a finger reciprocal in each groove; a pin fixed to each finger; an annulus rotatable relative to the work holder having cam slots receiving the pins whereby rotation of the annulus relative to the work holder causes radial movement of the fingers; cam means for rotating the annulus in one direction of rotation in response to said relative axial movements for moving the fingers outwardly to retract the brushes from the cutter during a portion of said relative axial movement and for moving the fingers radially inwardly to release the fingers from the brushes during another portion of said relative axial movement, said spring pressure then moving the brushes to engage the cutter after the cutter is between the brushes.

DONALD C. RIDGE.

No references cited.